United States Patent [19]

Khalil

[11] Patent Number: 5,155,725
[45] Date of Patent: Oct. 13, 1992

[54] ADAPTIVE TOKEN RELEASE MECHANISM FOR RING NETWORKS

[75] Inventor: Khalid M. Khalil, Piscataway, N.J.

[73] Assignee: Bell Communications Research, Inc., Livingston, N.J.

[21] Appl. No.: 637,183

[22] Filed: Jan. 3, 1991

[51] Int. Cl.⁵ .............................................. H04J 3/02
[52] U.S. Cl. ................................. 370/85.5; 370/85.6;
370/85.4; 370/85.15; 340/825.05
[58] Field of Search ................. 370/79, 80, 85.4, 85.5,
370/85.6, 85.14, 85.15; 340/825.05

[56] References Cited

U.S. PATENT DOCUMENTS

| Re. 28,811 | 5/1976 | Pierce | 179/15 AL |
|---|---|---|---|
| 3,796,992 | 3/1974 | Nakamura et al. | 370/85.6 |
| 4,566,097 | 1/1986 | Bederman | 370/85.5 |
| 4,675,671 | 6/1987 | Ishizuka et al. | 340/825.05 |
| 4,682,324 | 7/1987 | Ulug | 370/85.14 |
| 4,933,935 | 6/1990 | Adams | 370/85.7 |
| 5,051,986 | 9/1991 | Grow et al. | 370/85.4 X |
| 5,068,849 | 11/1991 | Tanaka | 370/85.4 X |

Primary Examiner—Douglas W. Olms
Assistant Examiner—Russell Blum
Attorney, Agent, or Firm—Leonard Charles Suchyta; Joseph Giordano

[57] ABSTRACT

A token ring network in which the token release mechanism adapts to the status of the other stations in the ring. Rather than releasing the token at the end of the token holding period, the token-holding station requests permission to continue transmitting. If permission is not denied by another station desiring to use the network, the token-holding station continues to transmit without interruption. Both absolute and relative priority can be accommodated with this adaptive token release mechanism. The permission denied message preferably comprises a simple modification of the request for permission to continue message.

12 Claims, 3 Drawing Sheets

TOKEN HOLDING STATION PROCEDURE

TOKEN RING NETWORK

FRAME FORMAT

CONTROL FIELD FORMAT

NON-TOKEN HOLDING STATION PROCEDURE

ADAPTIVE TOKEN RELEASE MECHANISM FOR RING NETWORKS

TECHNICAL FIELD

This invention relates to digital transmission systems and, more particularly, to improved token ring transmission systems.

BACKGROUND OF THE INVENTION

High speed token ring networks are often used to interconnect high performance computers and peripheral equipment. Such rings can also be used as a backbone transmission facility to interconnect local area networks (LANs). A token ring is a closed ring configuration in which a special frame, called the "token," is circulated and used to control access of multiple stations on the ring to the ring transmission facility. The protocol allows a newly active station to seize the transmission facility when the token is received at that station. The active station then transmits the data originated at that station and intended for another station on the ring. In order to provide fair access to the transmission facility, no station is allowed to hold the token longer than a specific amount of time, called the token holding time (THT). When the token holding time expires, the transmitting station must relinquish the token to allow other stations to seize the token and transmit their own data.

If there is only one active station on a token ring, the requirement to relinquish the token results in an idle period while the token circulates around the ring looking for another newly active station when no such newly active station exists. This idle period, equal to the latency time of the ring, limits the overall throughput of the the ring network and thus reduces the efficiency of the network. Moreover, the shorter the token holding time (in order to support larger numbers of users, support real-time applications, or merely to provide better sharing of the transmission facility), the larger the inefficiency.

SUMMARY OF THE INVENTION

In accordance with the illustrative embodiment of the present invention, status information about each station on a token ring network is shared with other stations on the ring in order to allow each station to determine whether or not to release the token or to continue to hold the token for another token holding period. Such status information can include the size of the transmission queue, the type of traffic to be transmitted, traffic priority, and so forth. This status information can be transmitted by means of a control frame or, preferably, by means of specific bits in the frame header or tailer. Using this information, an active station can determine whether there is any other active station on the ring. If the token-holding station realizes that it is the only active station and no other station in the ring is waiting for the token, then the active station keeps transmitting data. If another active station is detected, the token is released for the use of the other active station.

More particularly, when the token-holding station's token holding time expires, the next data frame includes a request for permission (RFP) to continue transmitting. This request for permission message circulates around the ring while the token-holding station continues to transmit data. If there is another station or stations waiting for the token, the waiting station changes the request for permission message to a permission denied (PD) message, possibly simply by modifying the request for permission message. If the request for permission message circulates around the ring and back to the token-holding station without a permission denied message being inserted, then the token-holding station initiates a new token holding period and continues transmitting data, thus avoiding any idle time waiting for a token to circulate around the ring. If a permission denied message is received, the token-holding station completes the transmission of current frame and then releases the token for the use of the other active station.

The token release mechanism of the present invention is termed "adaptive" since the decision of whether or not to release the token is adapted to the actual traffic demands of the stations on the ring rather than absolute, independent of the actual traffic demands of the other stations on the ring, as in the prior art token release mechanisms. Such adaptation of the token release action totally removes the idle period during which an unused token is circulated around the ring, and thus removes this major source of ring inefficiency.

The adaptive token release procedure of the present invention can support various kinds of priority. For example, a higher priority data source can be allowed to insert a permission denied message, while a lower priority data source can be prohibited from inserting a permission denied message. Another type of priority, called "relative" priority, can be implemented by assigning each station a different token holding period, the longer token holding periods being assigned to the higher priority stations. Indeed, absolute and relative priority can be mixed in a single system, for example, if absolute priority is required for synchronous traffic such as voice or video traffic, while relative priority is desired for difference sources of bursty asynchronous traffic.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
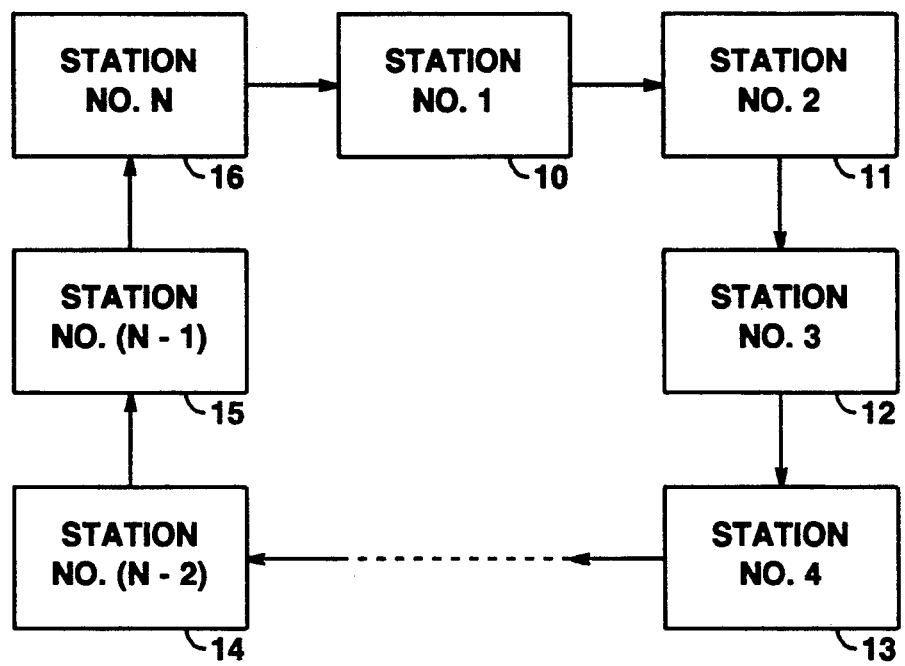
FIG. 1 shows a block diagram of a generic form of token ring network in which the adaptive token release technique of the present invention might find use.

In FIG. 1 there is shown a general block diagram of a token ring network comprising a plurality of stations 10–16 interconnected by a transmission line loop or ring. The transmission network of FIG. 1 is arranged to transmit frames of digital data around the ring from a source station to a destination station. In order to insure that one station, and only one station, transmits data on the ring at a time, a special data frame, called the "token," is circulated around the ring when all stations are idle, or at the start up of the ring transmission system. The first station wishing to transmit data detects the token on the ring, seizes the ring and substitutes station-originated data for the token frame. This actively transmitting station is called the token-holding station.

The token-holding station continues to transmit data frames until all available data frames are transmitted, or until a token holding period times out. The purpose of the token holding period is to prevent one station from monopolizing the ring transmission facility to the exclusion of all other stations. If the token-holding station allows other stations to use the ring at the end of the token-holding period, the ring transmission facility can be shared among the different stations on the ring. In the prior art, the token-holding station merely gave up the token, i.e., ceased transmitting data and transmitted the token frame to allow other stations to seize the transmission facility. While this procedure insures sharing of the transmission facility when more than one station wishes to transmit data, it is extremely wasteful if only the one station is active. That is, the time it takes to circulate the token frame around the ring, the ring delay or latency period, is entirely wasted since no data is being transmitted during this latency period, even though the original token-holding station may still wish to transmit data. The more extensive the token ring is, the greater the latency period and the greater the idle time. Moreover, the larger the ring, the higher the likelihood of many more stations on the ring. The more stations on the ring, the shorter the token holding period should be in order to permit fair sharing of the transmission facility. A shorter holding period also increases the inefficiency of the transmission facility since token frames must circulate in the ring more frequently.

In accordance with the present invention, a different protocol or strategy is used to insure sharing of the ring transmission facilities. In general, the stations are allowed to share information concerning their need for the transmission facility with the other stations. In this way, the transmission facility need only be given up when an actual need exists at another station for using the transmission facility. The information shared may be the status of the transmission queue (is any data waiting for transmission), the priority of the waiting traffic, or the type of signals to be transmitted. The sharing of this information allows the token sharing procedure to be adaptive to the actual state of the traffic demands on the system and no transmission time is wasted in polling the stations for activity by an unused token frame.

Figure 2:
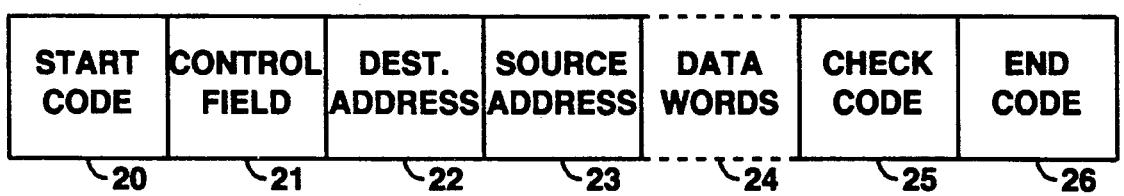
FIG. 2 shows a graphical representation of a typical data frame circulated around the token ring network of FIG. 1, and which incorporates a control field for implementing the adaptive token release technique of the present invention.

The manner in which such adaptive sharing of token ring transmission facilities is accommodated can be between understood by considering the balance of the figures. In FIG. 2 there is shown a graphical representation of a typical frame of data transmitted on the ring network of FIG. 1. The data frame of FIG. 2 comprises a start code 20 which is a unique code which marks the beginning of the data frame and allows all of the stations to receive the data synchronously. The second field of the data frame of FIG. 2 comprises a control field 21 which contains supervisory information indicating various control information concerning the frame of data. This control field 21 will be considered in more detail in connection with FIG. 3.

The data packet of FIG. 2 also includes a destination address field 22 which is used to signal the appropriate destination station that the data frame is intended for that destination station. A source address field 23 is also included to advise the destination station where the data frame originated and to allow the originating station to remove the frame from the ring. A plurality of data words 24 follow which contain the substance of the information to be transmitted from the source station to the destination station. A check code field 25 contains information permitting the receiving station to detect and/or correct errors occurring in the data 24. Finally, a stop code field 26 contains another unique code allowing all stations to unambiguously recognize the end of the data frame or packet.

Figure 3:
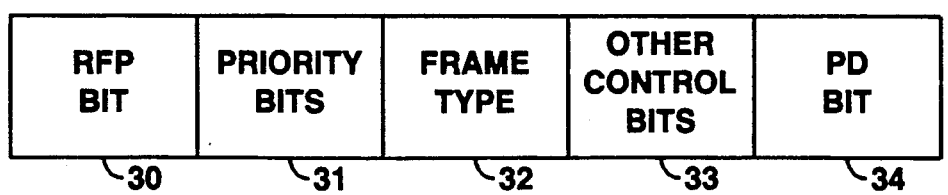
FIG. 3 shows a graphical representation of the control field of the data frame illustrated in FIG. 2 showing the "request for permission" message, the "permission denied" message, and the priority bits for implementing the adaptive token release technique of the present invention.

Referring to FIG. 3, there is shown a graphical representation of the contents of the control field 21 of FIG. 1. The control field format of FIG. 3 comprises a request for permission (RFP) bit 30 which is set to a "1" if the token-holding station has timed out the token holding period and wishes to ascertain if it can continue transmitting data or must give up the token to another station. In the illustrative embodiment of the present invention, the request for permission code is a single bit which is set to a "1." Clearly, many other codes and code values can be used to signal the other stations that the token-holding period has ended. In the preferred embodiment of the present invention, the first station receiving the request for permission code and which has data available to be transmitted, sets the permission denied bit 34 to "1." When the token-holding station receives its data frame with the RFP bit set to "1," it examines the PD bit. If the PD bit is "0," the token-holding station can continue to transmit data frames. If the PD bit has been set to "1," the token-holding station releases the token.

As will be discussed hereinafter, the PD bit may be set based on information included in priority bits 31, frame type 32 and in the other control bits 33. In order to permit adequate time to calculate the value of the PD bit, PD bit 34 may be included in the frame end code 26 (FIG. 2) rather than in the control field 21 of the frame header. A "0" in the RFP bit position is a permission denied (PD) code. Since all subsequent stations will then see the "0" in the RFP position, only the first will be able to respond. Moreover, when the token-holding station receives this data frame after transmission around the ring, the RFP bit is examined to determine if it has been changed to "0" (in which case the token must be given up) or remains a "1" (in which case the token-holding station can continue to transmit).

The control field format of FIG. 3 also includes a priority bit subfield 31 in which bits are reserved to indicate the relative priority of the data in that data frame. As will be discussed hereafter, these priority bits can be used to further determine whether or not the token must be given up by the currently active token-holding station. If, for example, the priority of the token-holding traffic is higher than the priority of the newly active station, the newly active station is not permitted to deny the token-holding station permission to continue. On the other hand, if the priority of the newly active station is higher than the priority of the token-holding station, the token-holding station will be forced to release the token in favor of the higher priority station.

The next subfield of the control field of FIG. 3 is frame type subfield 32. Frames may be of several different types including the token frame, data frames and supervisory frames. The token frame is the frame that circulates in the absence of any station traffic on the ring. A data frame is a frame containing data words from one station and destined for another station. Data frames may include synchronous data such as voice or video, or may include asynchronous data such as computer-to-computer exchanges. Supervisory frames include supervisory information such as that used for monitoring and maintaining the ring or for identifying failed stations.

The subfield 33 of the control field of FIG. 3 contains any other control information which the users of the token ring may wish to include. The final subfield 34 of the control field is the PD bit 34.

The signal formats of FIGS. 2 and 3 are merely illustrative and should not be taken as limiting. Such signal formats can have many different formats without changing the substance of the present invention. It is only necessary that the signal format include some mechanism, possibly no more than a single bit, for indicating to a token-holding station the relative activity status of the other stations on the ring. It is this status indication which allows the token-holding station to respond adaptively to the activity status of the ring and not give up the token when no other stations require the token.

Figure 4:
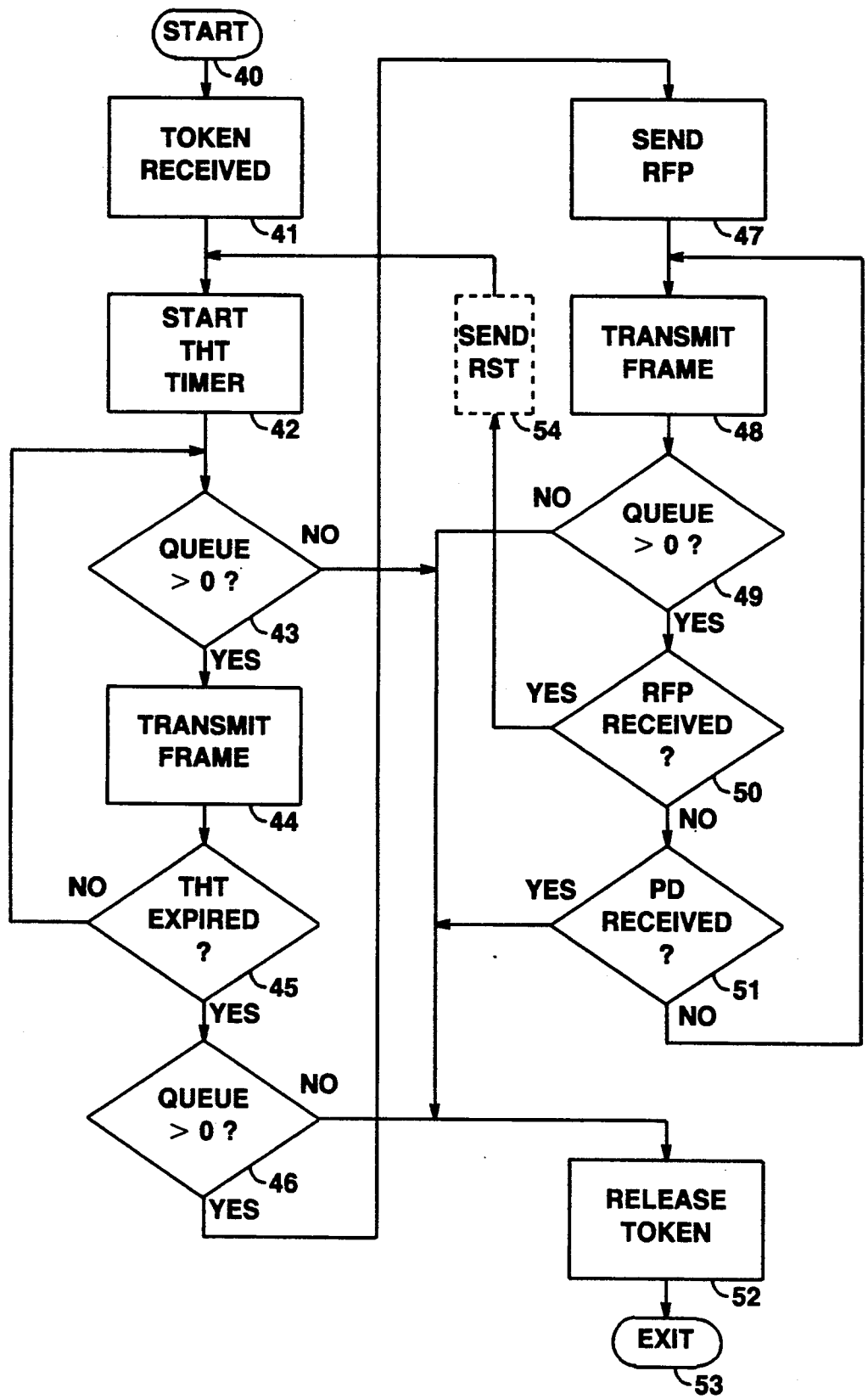
FIG. 4 shows a flow chart of the procedure which takes place in the token-holding station of the ring network of FIG. 1 in order to implement the adaptive token release mechanism of the present invention.

In FIG. 4 there is shown a detail flowchart of the operation of the token-holding, active station on the ring of FIG. 1. Starting at start box 40, the station receives the token in box 41, indicating that this station has the right to access the ring. In box 42 the token holding timer (THT) is started to time out the preselected token holding period. Decision box 43 is then entered to determine if the transmission queue contains data to be transmitted. If not, box 52 is entered to release the token and the process terminated in terminal box 53. If there is data in the transmission queue, as determined by decision box 43, box 44 is entered in which a data frame is transmitted on the ring. Thereafter decision box 45 is entered to determine if the token holding period has expired. If not, decision box 43 is re-entered to transmit any frames remaining in the transmission queue. If the token holding period has expired, as determined by decision box 45, decision box 46 is entered where it is determined whether or not the transmission queue has any frames for transmission. If not, box 52 is entered to release the token and the process terminated in box 53.

If the transmission queue is not empty, as determined by box 46, box 47 is entered to send the request for permission to continue transmitting data. As noted in connection with FIG. 3, sending the request for permission code merely requires setting the RFP bit to "1" in the header of an otherwise normal data frame. In box 48, this modified data frame is transmitted on the ring and thereafter decision box 49 is entered. In decision box 49, the transmission queue is again checked and, if empty, the token is released in box 52 and the process terminated in box 53. If the transmission queue is found not to be empty in decision box 49, decision box 50 is entered to determine if the request for permission code has been received, indicating that the token-holding station can continue to transmit. If so, the token holding time is restarted in box 42 and the entire process reiterated. If the RFP code has not been received, as determined by box 50, decision box 51 is entered to determine if the permission denied (PD) code has been received. If the PD code has been received, box 52 is entered to release the token and the process terminated in box 53. If the PD code has not been received, as determined by box 51, box 48 is re-entered to transmit the next data frame. The loop including boxes 48, 49, 50 and 51 is continually traversed until either the RFP code or the PD code is received. Thereafter, either the token is released (PD received) or the entire procedure of FIG. 4 restarted (RFP received).

Dashed box 54 is shown in the feedback loop from decision box 50 to box 42. Under the so-called timed token rotation (TTR) protocol, stations define a target token rotation time (TTRT) in which each station is guaranteed to receive the token periodically within, at most, twice the TTRT. This protocol is used to transmit synchronous traffic (e.g., voice and video) as well as asynchronous traffic (e.g., computer data). Synchronous frames, if present, are transmitted whenever a token is received. Asynchronous frames, if present, are transmitted only if the token is received early, i.e., less than TTRT. Each station includes a late counter (LC) to indicate whether the token is received early (LC=0) or late (LC=1). The late counter is incremented every TTRT seconds and is reset when the token is received. If the LC is incremented twice before the token is received, the station assumes that the token is lost (since the protocol guarantees that the token will be received before this time, i.e., $2 \times$ TTRT). The station therefore initiates a ring recovery procedure, interrupting any traffic on the ring.

Since the adaptive sharing mechanism of the present invention allows the token-holding station to continue to use the token for another THT period if no other station is waiting for the token, it therefore must be able to reset the LC counters at all of the other stations to prevent these stations from initiating a ring recovery procedure. This reset message can be included in the other control bit subfield 33. It is necessary to reset the late counters (LCs) before the token can be passed to that station. In that case, box 54 is used to send a "reset timer" (RST) message to reset the late counters of all of the other stations in a TTR ring. In all other respects, the adaptive token release mechanism of the present invention operates precisely the same on a TTR ring as on a standard token ring.

It will be noted that, if no other station requires the transmission facility, as indicated by the reception of the previously transmitted RFP code (and the failure to receive a PD code), then the token-holding station continues to transmit data frames without interruption. For this reason, the procedure of the present invention is called adaptive and does not require the loss of an entire ring delay period every token holding period in order to transmit the token around the ring.

Figure 5:
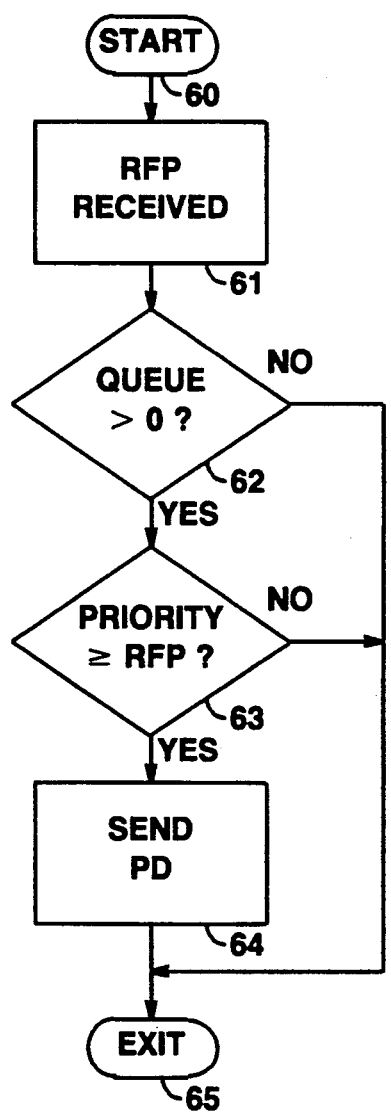
FIG. 5 shows a flowchart of the procedure which takes place in all of the non-token-holding stations of the ring network of FIG. 1 in order to implement the adaptive token release mechanism of the present invention.

In FIG. 5 there is show a flowchart of the procedure which takes place in all of the stations of the ring of FIG. 1 which are not holding the token and hence not actively transmitting data. Starting in start box 60, box 61 is entered to await the receipt of the RFP code.

When the RFP code is received, decision box 62 is entered in which it is determined if the transmission queue of this station has any data ready for transmission. If not, the procedure terminates at exit box 65. If there is data ready for transmission, decision box 63 is entered to determine if the priority of this station is equal to or greater than the priority of the data frame containing the RFP code. If not, the procedure again terminates in exit box 65. If the priority of the data to be transmitted from this station is equal to or greater than the priority of the received data frame, box 64 is entered to send the permission denied (PD) code. Thereafter the procedure is terminated in box 65.

It will be noted that all of the stations except the one station holding the token will be carrying out the procedure of FIG. 5. When the token-holding station sends an RFP message (box 47 of FIG. 4), the procedure of FIG. 5 is immediately started. If all of the stations on the ring were to be active at the same time, and all to have the same priority traffic, then the token would be passed downstream around the ring with each station transmitting for the token holding period plus the time required to circulate the RFP frame. Each station would theoretically receive the same amount of transmission time and hence receive a fair share of the transmission facilities. Higher priority traffic would, of course, squeeze out lower priority traffic. Real time processes, such as video or voice transmissions, would therefore receive the highest priority so as to take precedence over other kinds of data.

The priority scheme described above can be called absolute priority. Another type of priority is called relative priority. In systems using relative priority, each data transmission is assigned a different token holding time, the higher priority traffic receiving the longer holding time. In this way, the total time available for transmission on the ring will be divided between the stations in proportion to their holding times and hence their relative priorities. The adaptive token release mechanism of the present invention does not interfere with such relative priority and, indeed, makes relative priorities more efficient by eliminating the token circulation time after each token holding period. Relative priority and absolute priority can be mixed in a single system to achieve the performance objectives of the system designers.

It should also be clear to those skilled in the art that further embodiments of the present invention may be made by those skilled in the art without departing from the teachings of the present invention.

What is claimed is:

1. A token ring transmission system for transmitting frames of data comprising
   a closed loop transmission medium,
   a plurality of signal receiving and transmitting stations disposed around said closed loop,
   means at each said station for taking and holding a token for at least a preselected token holding period during which said frames can be transmitted,
   means included in said frames for requesting permission to continue transmitting after said preselected token holding period, and
   means at each said station for adaptively releasing said token in response to status information concerning other stations on said loop.

2. The token ring transmission system according to claim 1 further comprising
   means included in said frames for denying permission to continue transmitting after said preselected token holding period.

3. The token ring transmission system according to claim 1 further comprising
   means included in said frames for registering the priority of the accompanying data, and
   means at each said station responsive to said registered priority for influencing said means for adaptively releasing said token.

4. The token ring transmission system according to claim 1 further comprising
   late counters at said stations for measuring whether the token is received earlier or later than a target token rotation time, and
   means for resetting late counters in timed token rotation ring stations whenever said token is retained beyond said preselected token holding period.

5. A token ring transmission system for transmitting data frames between at least two stations on said ring, said system comprising
   means at a sending station for including in said data frames a first code indicating that a preselected period has expired at said sending station,
   means at a receiving station for changing said first code to a second code at said receiving station having data frames to be transmitted,
   a token holding timer at said stations, and
   means at said stations for resetting said token holding timer in response to said second code.

6. The token ring transmission system according to claim 5 further including
   means at said sending station for transmitting a reset message when said preselected period has expired at said sending station.

7. The token ring transmission system according to claim 5 further including
   means at said stations for including a priority code in each of said data frames and
   means at said stations responsive to said priority code for conditioning said means for changing said first code to said second code.

8. The token ring transmission system according to claim 5 further including
   means at said stations for including a priority code in each of said data frames and
   means at said stations responsive to said priority code for conditioning said means for changing said first code to said second code.

9. A token ring transmission system for transmitting blocks of digital data between a plurality stations on said ring, said system comprising
   means at each said station for seizing a token transmitted on said ring to enable transmission on said ring by an active station,
   means at each said station for indicating the activity status of said each station to an active station which has seized said token, and
   means at said active station, responsive to said means for indicating activity status, for selectively releasing or holding said token.

10. The token ring transmission system according to claim 9 further comprising
    means included in said blocks for requesting permission to continue transmitting after a preselected token holding period.

11. The token ring transmission system according to claim 9 further comprising means included in said blocks for denying permission to continue transmitting after a preselected token holding period.

12. A method for transmitting information in a token ring transmission system having a plurality of stations connected in a closed loop, said method comprising the steps of circulating a token ring around the loop, said token ring determining the active one of said stations on the loop, defining at an active station a preselected holding time for said token ring at said active station, transmitting a request from said active station to the other stations on the loop for information as to their activity status, and responsive to said request received back at said active station releasing said token ring at said active station or initiating an additional holding time for said token ring at said active station.

* * * * *